Sept. 1, 1925.
A. A. KRAMER ET AL
1,552,060
CARBON FEEDING MECHANISM
Filed Oct. 27, 1923
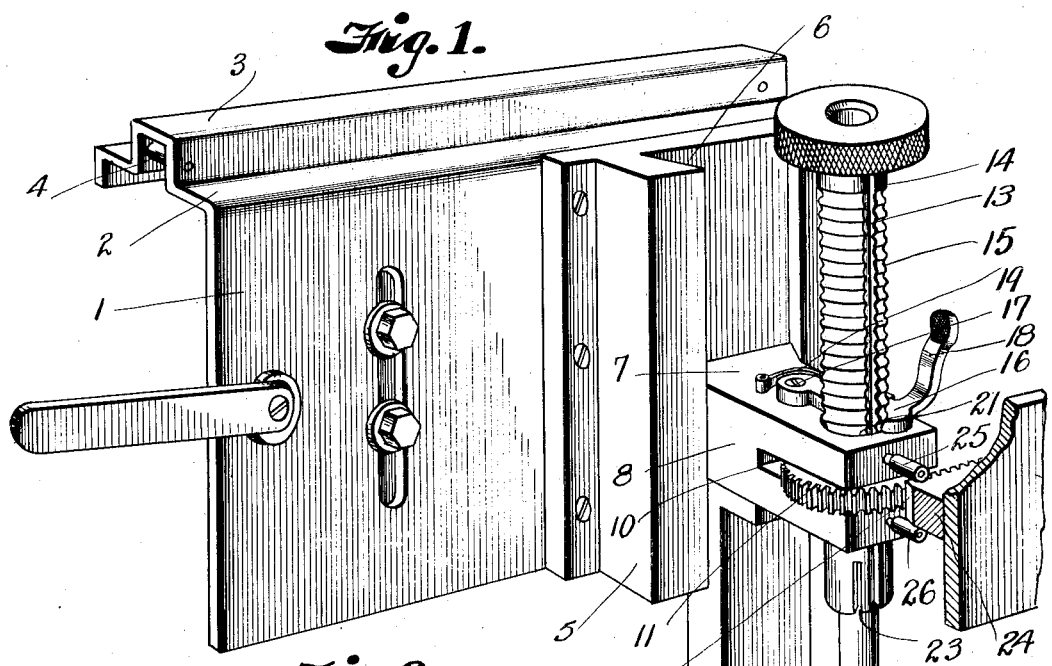
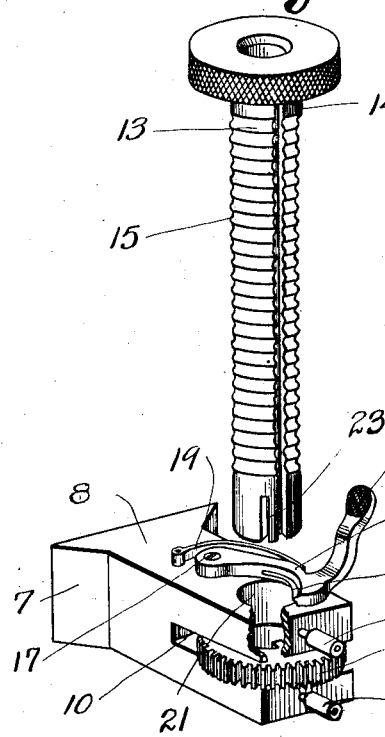
INVENTOR
Andrew A. Kramer.
BY Alvah M. Griffin.
ATTORNEY

Patented Sept. 1, 1925.

1,552,060

UNITED STATES PATENT OFFICE.

ANDREW A. KRAMER AND ALVAH M. GRIFFIN, OF KANSAS CITY, MISSOURI.

CARBON-FEEDING MECHANISM.

Application filed October 27, 1923. Serial No. 671,191.

*To all whom it may concern:*

Be it known that we, ANDREW A. KRAMER and ALVAH M. GRIFFIN, citizens of the United States, residing at Kansas City, in the county of Jackson and State of Missouri, have invented certain new and useful Improvements in Carbon-Feeding Mechanism; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to carbon electrode feeds and particularly to a mechanism for feeding carbon electrodes for welding machines, the purpose of the invention being to feed the carbon progressively as the carriage moves across the work.

The novelty of the invention will be understood by reference to the following description in connection with the accompanying drawings, in which:

Fig. 1 is a perspective view of an electrode carriage showing the holder, the electrode in operative position with the feed bar partly in section and partly perspective.

Fig. 2 is a perspective view of the holder and the head for receiving it, and

Fig. 3 is a perspective view of the holder rotating pinion.

The carriage for traversing the electrode across the work is shown as comprising a plate 1, having a right angularly projecting portion or angle 2 at its upper edge with an off set channel 3 on which are mounted rollers 4, the rollers being adapted to ride over a rail. The plate is adapted to be moved back and forth by a suitable means, for example, a chain and drive mechanism. The plate 1 carries a guide 5 with a dove tailed groove 6 to receive the dovetail 7 of the head or block 8 from which depends a bracket 9. The head or block 8 is bifurcated by a slot 10 in which is located a pinion 11, the pinion has an inwardly projecting tooth 12 which engages an elongated groove 13 in the carbon holder 14. The carbon holder is cylindrical and it is provided with a plurality of annular grooves 15 adapted to be engaged by an arcuate latch or dog 16 pivoted to the head at 17 and having a handle or finger 18, by means of which it can be drawn back by action of the leaf spring 19 also carried by the block. The arcuate edge of the dog is provided with a curved rib 20 to engage any of the grooves 15 of the holder which projects through the vertical opening 21 in the head 8. The rib 20 will permit the holder to rotate but will prevent it from having longitudinal movement with respect to the head or block when one of the grooves 15 is engaged by the rib 20. The vertical movement of the electrode 22 in socket 23 of the holder being effected by an inclined feed bar 24 straddled by the outstanding fingers 25 and 26 carried by the head and the rotatable movement of the holder will be effected by the rack or teeth 27 which engages the teeth of the pinion 11.

When the parts are assembled and appropriate means is provided for moving the carriage consisting of the plate 1 and its appurtenances in one direction the fingers 25 and 26 preferably provided with sleeves will ride down the incline bar 24 so that the slide consisting of the head 8 and bracket will be moved vertically in the guide 6 and if the bar is at the proper angle of inclination the point 28 of the electrode 22 will be maintained a uniform distance from the work 29. The bar can be set at various angles depending upon the amount of current to be passed to the electrode, this being important and it will be necessary to feed the electrode faster when heavy current is going through, than when lighter current is passing. When the carriage has reached the limit of its traversing movement the electrode will be set down as far as it can set, then the carriage can be returned to its original position and a new electrode put in the socket 23 or the latch 16 can be drawn out of engagement with the holder and the holder can be moved longitudinally in a downward direction to bring the point of the electrode the proper distance away from the work, then the machine can be operated again with assurance that there will be a positive progressive feed of the electrode to maintain its end the proper distance away from the work during the entire traversing movement of the carriage.

What we claim and desire to secure by Letters-Patent is:

1. In a device of the class described, a carriage having a vertical guide, a vertically movable slide in the guide having outstanding fingers, an inclined bar straddled by the fingers so the slide will be moved longitudinally when the carriage travels horizontally, a carbon holder in the slide having circumferential annular grooves, means for rotating the carbon holder and a detent engageable with any one of the grooves for holding the carbon holder against longitudinal movement with respect to the slide, said detent being releasable to permit free vertical adjustment of the carbon holder.

2. In a device of the class described, a horizontal movable carriage, a vertical guide on the carriage, a vertical slide in the guide, an inclined bar operatively connected to the slide to move it vertically as the carriage moves in one direction, a carbon holder projecting through the slide provided with parallel circumferential grooves, a pivoted detent on the slide engaging one of the grooves to permit the holder to rotate but holding it against longitudinal movement and means for rotating the carbon holder.

In testimony whereof we affix our signatures.

ANDREW A. KRAMER.
ALVAH M. GRIFFIN.